United States Patent [19]

Hjortzberg

[11] 4,404,585

[45] Sep. 13, 1983

[54] VIDEO SEQUENTIAL COLOR SYSTEM

[76] Inventor: Bernhard A. Hjortzberg, 1320 Carmelita, Laguna Beach, Calif. 92691

[21] Appl. No.: 309,721

[22] Filed: Oct. 8, 1981

[51] Int. Cl.³ .............................................. H04N 9/04
[52] U.S. Cl. ....................................... 358/41; 358/42
[58] Field of Search ................................... 358/41, 42

[56] References Cited

U.S. PATENT DOCUMENTS 3,794,408  2/1974  Ian et al. ............................... 358/42

*Primary Examiner*—Michael A. Masinick
*Attorney, Agent, or Firm*—Roger C. Turner

[57] ABSTRACT

An improved single element sequential color system processes luminance information as high resolution signals and chroma information as low resolution signals. The system requires relatively much less data storage capacity than conventional systems. Sequential three-color systems are disclosed which utilize analog circuitry and which utilize digital circuitry to process the signals. Other embodiments disclose four-color systems wherein a primary color is followed two scans later by its complementary color. The complementary four-color systems provide unique addition and subtraction of the signals to process the chroma information. The four-color systems are shown which utilize analog signal processing and which utilize digital signal processing.

12 Claims, 4 Drawing Figures

VIDEO SEQUENTIAL COLOR SYSTEM

BACKGROUND OF THE INVENTION

The invention relates to a video sequential color system, and more particularly, to a miniature, compact and lightweight color camera system.

Video color camera systems require at least three independent video signals, such as red blue and green for transmission of a color scene. Early systems required three image sensing devices (vidicon tubes) to generate the red, blue and green information signals for processing the color image of the scene.

Field sequential color systems are generally well known and involve the use of a single image sensing device which sequentially receives the red, blue and green color information at a high cycle rate. These signals are stored and processed for color transmission. Sequential systems require that the signals be separated into at least three independent spectral regions, usually red blue and green.

Some systems utilize a series of striped filters, such as red, blue and green, positioned over the viewing surface of the image sensing device to separate the image into three spectral regions. A problem with the striped filter systems is that the information received by each color region is only over ⅓ of the image sensing surface which greatly reduces the clarity or resolution of the image.

Other sequential systems utilize a series of dichroic mirrors, or rotating color filter wheels, or three high frequency colored strobe lights to sequentially illuminate the scene and to separate the signals into three independent spectral regions. One such representative prior art system is shown in U.S. Pat. No. 4,253,447 issued Mar. 3, 1981 to Moore et al. This patent describes a color endoscope having a single CCD image sensing device with three colored light sources to sequentially illuminate an object to be televised. The full resolution signals from the CCD are stored in analog CCD memory banks for processing into standard broadcast format. Typical prior art systems utilize a three color primary color system of red, blue and green and process the full resolution signals.

Video color signals are functions of numerous components. The major components include a luminance component representing the brightness or intensity of the scene being televised, and three or more color or chroma components. The signals from the image sensing device are referred to as full resolution read-out signals. The full resolution luminance signals are required for every picture element for high resolution transmission. The luminance signals cover a bandwidth of about 3 MHz and require a sampling rate of about 6 MHz. This corresponds to 244 lines of picture height, with 320 horizontal picture elements, and a six bit identification code for a total of about 468K bits ($244 \times 320 \times 6$) of data storage capacity for each field scan of the image sensing device.

The present invention recognizes that the chroma component information signals have properties which are relatively lower in acuity and perceptibility by the human eye than are the luminance components. These lower acuity properties permit the chroma information to be identified by a much lower sampling rate, without any noticable degradation in resolution to the human eye. The chroma signals can therefore be processed as low resolution signals having a bandwidth of about 0.5 MHz and a sampling rate of 1 MHz. This corresponds to 40 lines with 50 elements having a four bit identification code for a total of 8K bits ($40 \times 50 \times 4$) of data storage capacity for each scan of the image sensing device.

The present invention also recognizes two basic color principles. One basic principle is that two complementary colors add to neutral. Another basic principle is that three independent chroma signals are defined to add to zero. A third chroma signal can therefore always be found as the negative of the sum of the other two signals.

By utilizing the properties of low acuity chroma signals, complementary addition to neutral, and three chroma addition to zero, field sequential color signal processing can be uniquely and significantly simplified.

SUMMARY OF THE INVENTION

It is therefore an object of the present invention to provide an improved miniature video color camera system having high resolution performance.

It is another object of the present invention to provide a video color system which is compact, lightweight, and inexpensive to produce.

These and other objects of the present invention are attained by providing a video sequential color processing system utilizing a single element image sensing device and a sequential color unit to separate the signals into independent spectral regions. The image sensing device provides full resolution read-out signals for each scan, in a sequential color flow relationship. A separating unit, such as a low pass filter is used to separate low resolution signals from the full resolution signals. The low resolution signals require relatively much less storage capacity than the full resolution signals. The low resolution signals from the separating unit are transferred into a first memory unit and correspond in time to one scan later than the signals from the separating unit. The signals from the first memory unit are further transferred into a second memory unit and correspond in time to two scans later than the signals from the separating unit. The low resolution signals from the separating unit, from the first memory unit, and from the second memory unit are simultaneously received by a signal processing unit. A timer synchronizes the sequential coloring unit, the image sensing device and the signal processing unit. The signal processing unit combines and sorts the sequential signals resulting in outputs of continuous, low resolution, primary chroma signals. A television encoder receives the full resolution luminance signals, and the low resolution chroma signals from the signal processing unit, and encodes the signals into standard broadcast format.

One embodiment of the present invention utilizes a four color sequential system having two sets of complementary colors which further simplifies the signal processing of the signals.

Another embodiment utilizes a three color sequential system with unique signal processing.

BRIEF DESCRIPTION OF THE DRAWINGS

While the novel features of the invention are set forth with particularity in the appended claims, the invention will be better understood along with other features thereof from the following detailed description taken in conjunction with the drawings, in which:

DESCRIPTION OF THE PREFERRED EMBODIMENTS

Figure 1:
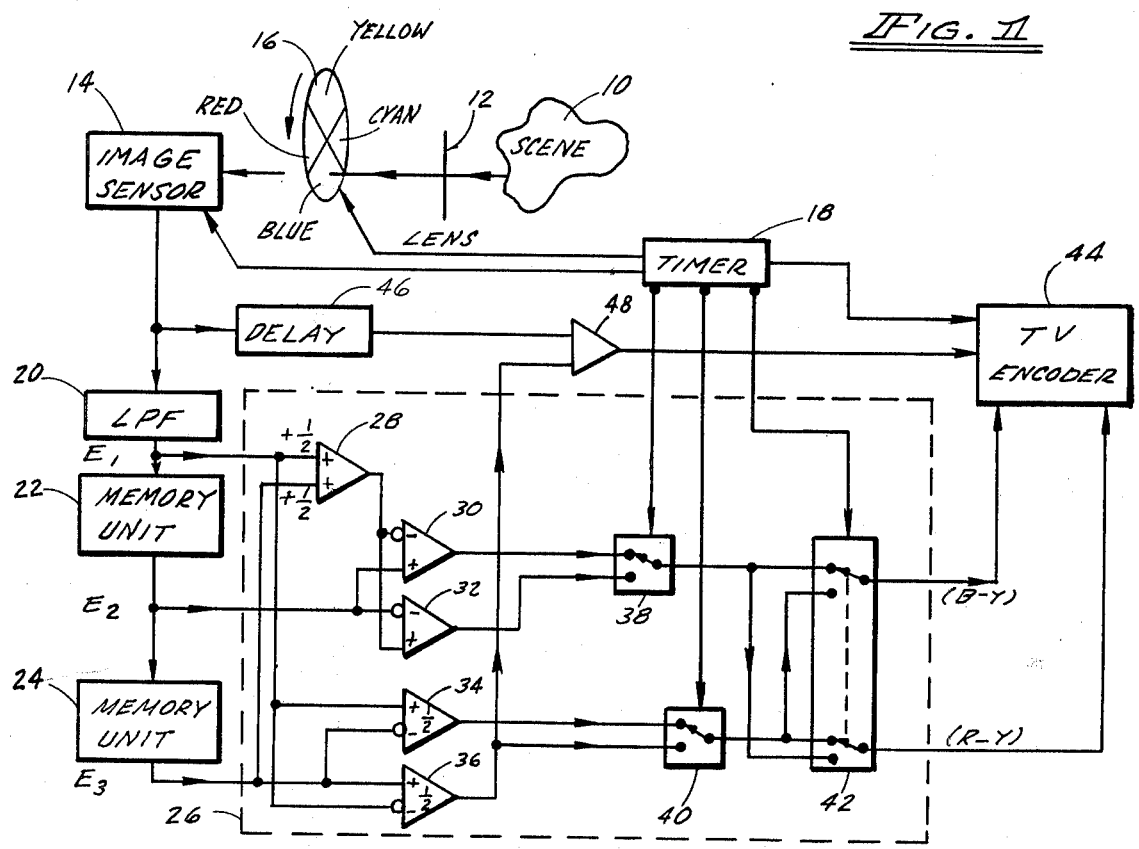
FIG. 1 is an electrical systematic diagram of a video camera utilizing a sequential four-color system and analog circuitry according to the present invention.

Referring first to FIG. 1, there is shown a systematic diagram of one embodiment of the present invention. A scene 10 which is desired to be televised, is focused by a lens system 12 onto a single element image sensing device 14. The image sensing device is preferred to be a solid state scanning device known as a charge coupled device (CCD), however, the invention is not limited to a CCD type camera and can be utilized with conventional vidicon or other type of single element image sensor of conventional color cameras. Typical CCDs may have 488 line by 320 pixel grid pattern, or a 244 line by 320 pixel grid pattern, or other such grid pattern. In operation, light energy falling upon the CCD surface causes electrons contained within each pixel region to accumulate into charge packets. After a timed interval, the charge in each packet is applied to an electrode associated with the pixel thereby providing an electrical read-out of the visual image information recorded on the receiving surface. The data stored in the image sensor is then clocked out of the element in a line by line sequence similar to that employed in a serial flow shift register.

A sequential coloring means 16 is shown as a four quadrant color wheel which is rotated between the scene 10 and the image sensing device 14, to separate the colors of the scene into independent spectral regions. Alternatively, the sequential coloring means could be provided by illuminating the scene with high intensity strobe lights of specific selected color sequence, which is synchronized with the image sensing device. For endoscopic applications, the sequential coloring means could be provided by utilizing fiber optics to illuminate the desired scene. In general, the scene to be televised projects an image which is composed of different spectral regions. The sequential coloring means 16 separates the regions so that a single image sensing device can sequentially analyze the image, one color region at a time. The sequential color information is then stored and subsequently processed to televise the color image. The rate of color selection of the sequential coloring means 16 is controlled by a timer 18 which also synchronizes the scanning rate of information at the image sensing device 14.

A unique feature of the present embodiment of the sequential coloring means is that a four-color system is used with the colors arranged in sets of complementary colors. A primary color such as red is followed two fields later by its complementary color cyan, and another primary color such as blue is followed two fields later by its complementary color yellow, during the cycle. Similarly, any sets of complementary colors could be used, such as orange-turquoise and green-purple, as long as the color spectrum is generally represented. The selection of sets of complementary colors recognizes the principle that complementary colors add to neutral, which reduces the signal processing.

Another unique feature of the present invention is the separation of the low resolution information signals from the full resolution information signals. The signal output from the image sensing device is in the nature of full resolution luminance and chroma. Luminance refers to brightness while chroma refers to color. As discussed in the Background of the Invention, the acuity and perceptibility of the eye requires a high sampling rate to perceive high resolution luminance; but only about one-sixth the sampling rate to perceive a sufficient resolution of the chroma information. The full resolution signals are separated so that the luminance can be processed as a high resolution signal, and the chroma which requires data storage can be processed as a low resolution signal. In prior art systems, the full resolution information signals from a CCD would flow into analog memory units requiring about 500K bits of storage capacity. However, in the present system, the chroma information can be stored in conventional random access memory (RAM) units requiring a capacity of only 8K bits.

The output from the image sensing device 14 is connected to a separating means, such as a low pass filter (LPF) 20, to separate the low resolution information from the high resolution information signals. A typical LPF has a bandwidth of about 0.5 MHz compared to a bandwidth of about 3 MHz required for full resolution luminance. The low resolution signals through the LPF are connected to a first memory unit 22. The signals at the output of memory unit 22 correspond in time to a field scan which is one scan later than the signals from the LPF.

The signals from memory unit 22 flow into a second memory unit 24. The signals at the output of memory unit 24 correspond in time to a field scan which is one scan later than the output of the memory unit 22, and two scans later than the output of the LPF 20.

The signals from the LPF 20, from memory unit 22, and from memory unit 24 are directed into a signal processing unit 26. The signal processing unit includes a summing amplifier 28, a first pair of differential amplifiers 30 and 32, and a second pair of differential amplifiers 34 and 36, and a switching network. The elements are shown as discrete elements, however the signal processing unit could readily be combined into an integrated chip. Since the present invention allows the low resolution complementary signals to be readily combined, it should be clear to one skilled in the art that other arrangements of adding and subtracting elements could be employed without departing from the teachings of the present invention.

The signal processing unit receives the low resolution luminance and chroma signals from LPF 20 at one terminal of the summing amplifier 28. The output of memory unit 24 includes low resolution luminance and a chroma signal which is the complement to the chroma signal from the LPF, and is connected to the other terminal of the summing amplifier 28. The addition of the signals result in low resolution luminance information at the output of amplifier 28. The output of memory unit 22 is connected to the noninverting terminal of differential amplifier 30 and to the inverting terminal of amplifier 32. The output of amplifier 28, consisting of low resolution luminance, is connected to the other terminal of the pair of amplifier 30 and 32, whereby luminance is subtracted from the signals from memory unit 22, resulting in chroma signals at the outputs of amplifiers 30 and 32.

The output of memory unit 24 ($E_3$) consists of low resolution luminance (Y) and chroma signal ($D_3$) and is connected to the inverting terminal of differential amplifier 34 and to the non-inverting terminal of differential amplifier 36. The output of LPF 20 ($E_1$) consisting of luminance (Y) and chroma signal ($D_1$) which is complementary to the signals from memory unit 24 ($D_1 = -D_3$), is connected to the other terminals of amplifiers 34 and 36. The differential amplifiers 34 and 36 have a gain of $\frac{1}{2}$ and combine the signals. For example, at amplifier 36: $\frac{1}{2}(E_3 - E_1) = \frac{1}{2}[(Y + D_3) - (Y - D_3)] = D_3$. The amplifiers subtract luminance and result in sequential chroma information signals at the outputs of amplifiers 34 and 36. The outputs of amplifiers 34 and 36 are orthogonal to the chroma output signals from amplifiers 30 and 32.

A switching network shown as switch 38, 40 and 42 are controlled by timer 18 to select and direct the primary sequential chroma signals, such as (B-Y) and (R-Y) from each of the differential amplifiers, and directs the outputs as continuous chroma signals to a TV broadcast encoder 44.

The full resolution luminance information signals are provided by taking the high resolution signals, which are not passed by LPF 20, from the CCD 14. The signals are directed through a delay line 46 to synchronize the timing of the signals and then to the input of a summing amplifier 48. The output of differential amplifier 36 is connected to the other terminal of amplifier 48, to cancel the chroma information signal, resulting in high resolution luminance at the output of the amplifier 48. The output of amplifier 48 is further directed into TV broadcast encoder 44, which is also synchronized by timer means 18. The encoder 44 then encodes the luminance and the chroma signals into the desired NTSC, PAL, or SECAM format for recording or broadcasting the processed color signals of the scene. An alternative encoding system could be used to generate only red, blue and green signals for use on a monitor system.

Figure 2:
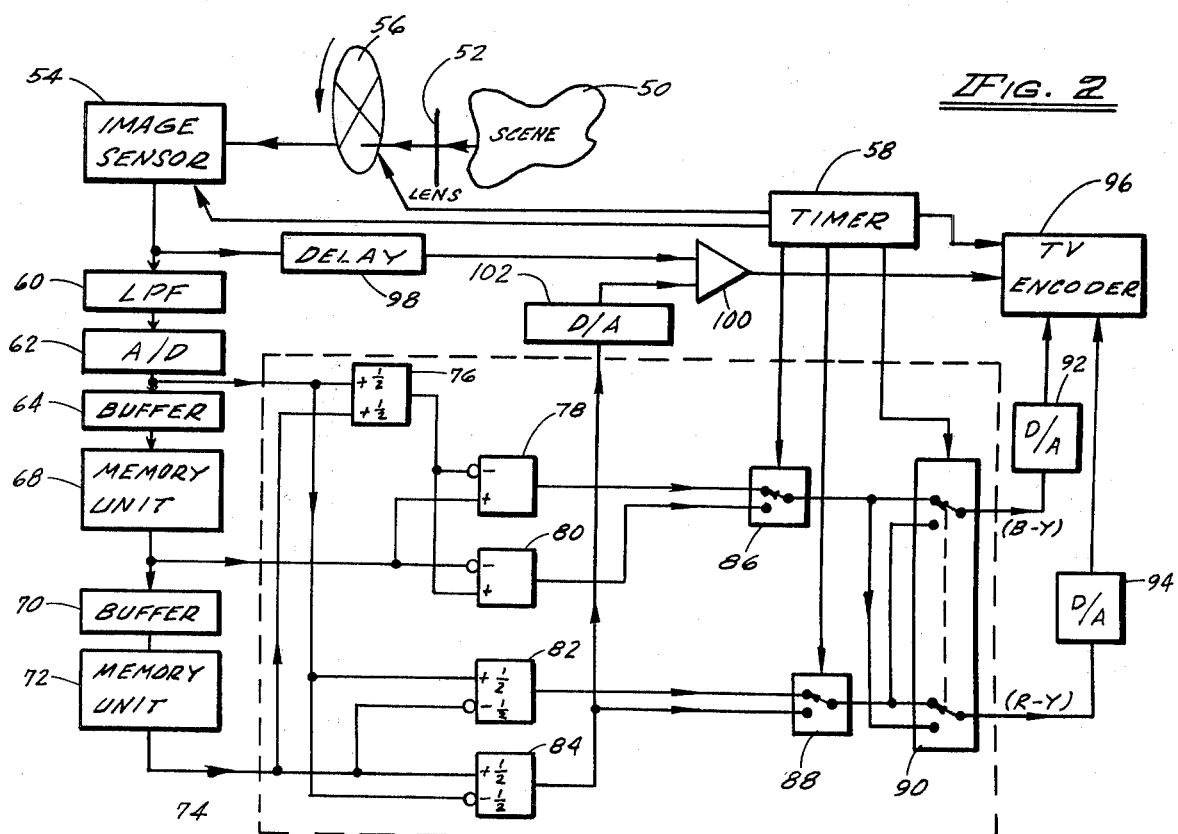
FIG. 2 is an electrical systematic diagram of a video camera utilizing a sequential four-color system and digital circuitry.

Referring now to FIG. 2, there is shown a camera system similar to that described in reference to FIG. 1, except that this system utilizes digital circuitry to process the signals. Digital information signals can be precisely controlled and synchronized more readily than analog information signals. A scene 50 to be televised is focused by a lens system 52 onto an image sensing device 54, such as a CCD. A sequential coloring means 56 is shown as a color wheel having two sets of opposed complementary colors, which rotates synchronously with the scanning of the CCD, as controlled by a timer means 58.

The full resolution luminance and chroma information signals are divided into low resolution information signals by separating means such as low pass filter (LPF) 60. The low resolution signals from the LPF flow into an analog to digital converter means (A/D) 62. The A/D converts the signals into binary coded digital signals to facilitate processing. The low resolution signals can be readily identified by a suitable address code and data code corresponding to the capacity of the memory units.

The output of the A/D 62, corresponds to a zero reference time of the system, and continues through a buffer 64 and into a first memory unit 68. The buffer accumulates the digital encoded luminance and chroma signals from the LPF, while the memory unit 68 is transferring information relating to the same scan line which was received one field earlier. The contents of the buffer is transferred into the memory unit during the horizontal blanking time which follows the present scan line, replacing the information which has just been received. At the end of the blanking time, the buffer is emptied and is ready to accept new information relating to the next scan line. With rapid data storage and transfer devices, a buffer may not be necessary, but is shown with the preferred embodiment of the system. The output of first memory unit 68 corresponds in time to a field scan which is one scan later than that at the output of A/D 62.

The output of memory unit 68 is further transferred through a second buffer 70 into a second memory unit 72. Buffer 70 and memory unit 72 perform similarly as the first buffer and the first memory unit to receive and transfer digital signals. The output of memory unit 72 corresponds in time to a field scan which is one scan later than the information at the output of first memory unit 68, and two scan later than the information at the output of A/D 62.

The outputs from the A/D 62, from memory unit 68, and from memory unit 72 are processed in a signal processing unit 74. The signal processing unit includes a digital adder unit 76, a first pair of digital subtractor units 78 and 80, and a second pair of digital subtractor units 82 and 84, and a switching network. The output from A/D 62 consists of low resolution luminance and chroma information signals, and is connected to one terminal of the adder unit 76. The output from memory unit 72 consists of low resolution luminance and chroma signals, which are complementary to the signals at the A/D 62, and is connected to the other terminal of adder unit 76. The complementary components cancel each other, resulting in low resolution luminance information signals at the output of adder unit 76. The output of memory unit 68 consists of low resolution luminance and chroma signals and is connected to the noninverting terminal of subtractor unit 78, and to the inverting terminal of subtractor unit 80. The low resolution luminance signal from the output of adder unit 76 is connected to the other terminal of the pair of subtractor units 78 and 80. The subtractor units 78 and 80 subtract luminance from the signals, resulting in chroma signals at the output of subtractor units 78 and 80.

The output from memory unit 72 consists of low resolution luminance and chroma signals and is connected to the inverting terminal of subtractor unit 82 and to the noninverting terminal of subtractor unit 84. The output from A/D 62 consisting of low resolution luminance and chroma signals, which are complementary to the signals from memory unit 72, and is connected to the other terminal of subtractor units 82 and 84. The subtractor units 82 and 84 have a gain of $\frac{1}{2}$ and cancel the low resolution luminance from the subtracted signals, resulting in chroma signals at the output of subtractor units 82 and 84. The outputs of subtractor units 78 and 80 are always sequential chroma signals (or the complement of that signal) while the outputs of subtractor units 82 and 84 are sequential chroma signals (or the complement of that signal) which are always orthogonal to the signals at the first pair of subtractor units 78 and 80.

A switching network consisting of switches 86, 88 and 90 are controlled by the timer means 58 to select and direct the primary chroma signals, such as (B-Y)

and (R-Y) as continuous outputs of the signal processing unit 74. Each chroma signal is directed to digital to analog converters (D/A) 92 and 94 which convert the binary digital signals back to analog signals and direct the signals to a TV encoder 96. The full resolution luminance information is provided by passing the high resolution luminance and chroma signals from the CCD through a delay line 98 to a summing amplifier 100. The chroma signals from subtractor unit 84 are passed through a D/A converter 102 and is connected to the other terminal of amplifier 100, resulting in full resolution luminance. The full resolution luminance signals from amplifier 100 are directed into encoder 96, synchronized by timer means 58, where the signals are encoded into the desired standard format.

Figure 3:
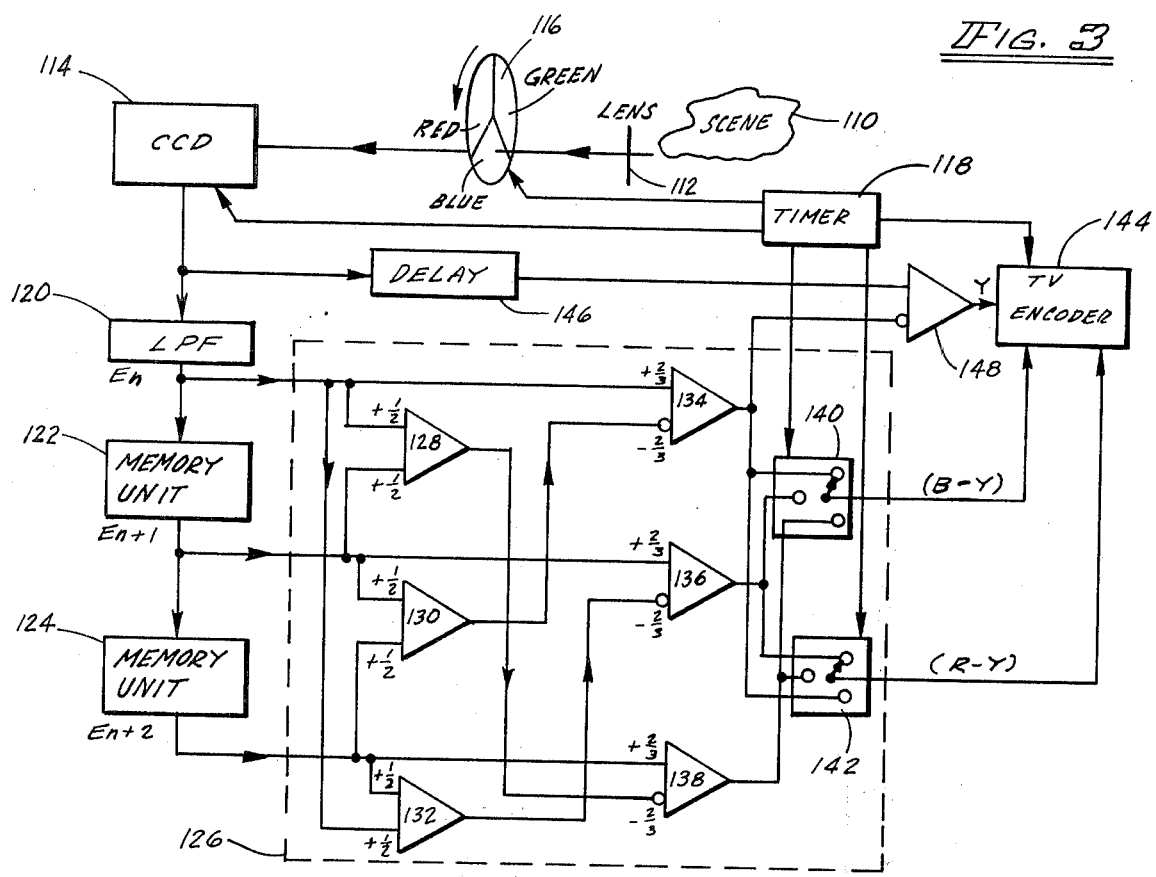
FIG. 3 is an electrical systematic diagram of another embodiment of a video camera utilizing a sequential three-color system and analog circuitry.

Referring now to FIG. 3, there is shown another embodiment of the invention, similar to that described in reference to FIG. 1, wherein this system employs a three-color sequential system having analog circuitry to process the signals. A scene 110 to be televised is focused through a lens system 112 onto the surface of an image sensing device such as a CCD 114. A sequential coloring means 116 is provided by a rotating color wheel filter, to sequentially separate the images from the scene into three primary spectral color regions, such as red blue and green for sensing by the CCD. The rate of color selection is controlled by a timer 118 which also synchronizes the scanning rate of the CCD. The output from the CCD is a line by line serial flow signal, containing the full resolution color signals. The full resolution output of the CCD is connected to a low pass filter (LPF) 120 which separates the low resolution signals from the high resolution luminance and chroma information signals. As previously discussed, the low resolution information signals require much less storage capacity and signal processing than the high resolution information signals. The output of the LPF is in the form of low resolution luminance and chroma, with some attenuation factors.

The output from the LPF is directed to a first memory unit 122 and then to a second memory unit 124. The memory unit 122 receives the low resolution information signals from LPF 120 and has an output corresponding in time to a field scan which is one scan later than the output of the LPF. The output of the memory unit 122 is further transferred to the memory unit 124, which has an output corresponding in time to a field scan which is one scan later than the output of memory unit 122, and two scans later than the information at the LPF 120.

The low resolution information signals from LPF 120, from memory unit 122, and from memory unit 124 are directed to a signal processing unit 126. The signal processing unit 126 utilizes the relationship that the sum of the three chroma signals is zero; and therefore, any one of the signals can be expressed as the negitive of the sum of the other two signals. This is based upon the following equations: The Broadcast Standard is well known to define luminance by the relationship, $Y=0.11B+0.59G+0.30R$. The color wheel filters are selected so that the chroma signals are: $D_n=0.11(B-Y)$, $D_{n+1}=0.59(G-Y)$, and $D_{n+2}=0.30(R-Y)$; and $$\begin{aligned} D_n + D_{n+1} + D_{n+2} &= .11(B-Y) + .59(G-Y) + .30(R-Y) \\ &= .11B + .59G + .30R - (.11 + .59 + .30)Y \\ &= Y - Y \\ &= 0 \end{aligned}$$

The signal processing unit includes three summing amplifiers 128, 130 and 132; three differential amplifiers 134, 136 and 138; and a switching network including switches 140 and 142. The summing amplifiers 128, 130 and 132 perform the summation, which can be subtracted from the corresponding third signal at the differential amplifiers 134, 136 and 138. As an example of the signal processing, the summation of the signal from LPF 120 ($E_n$) and the signal from memory unit 122 ($E_{n+1}$), using a gain of ½ at the summing amplifier 128, is:

$$\begin{aligned} \tfrac{1}{2}(E_n + E_{n+1}) &= \tfrac{1}{2}(Y + D_n) + \tfrac{1}{2}(Y + D_{n+1}) \\ &= \tfrac{1}{2}(2Y) + \tfrac{1}{2}(D_n + D_{n+1}), \text{ and} \\ D_n + D_{n+1} &= -D_{n+2} \\ &= Y - \tfrac{1}{2}D_{n+2} \end{aligned}$$

Differential amplifier 138 combines the signals from memory unit 124 ($E_{n+2}$) with the above summation, using a gain of ⅔:

$$\begin{aligned} &= \tfrac{2}{3}(E_{n+2}) - \tfrac{2}{3}(Y - \tfrac{1}{2}D_{n+2}) \\ &= \tfrac{2}{3}(Y + D_{n+2}) - \tfrac{2}{3}Y + (\tfrac{2}{3})(\tfrac{1}{2})D_{n+2} \\ &= \tfrac{2}{3}D_{n+2} + \tfrac{1}{3}D_{n+2} \\ &= D_{n+2} \end{aligned}$$

Similarly, each differential amplifier has a sequential output of $D_n$, $D_{n+1}$, and $D_{n+2}$; the desired chroma signals.

The summing amplifier 128 receives low resolution signals from the LPF 120 and memory unit 122. Summing amplifier 130 receives an input from memory unit 122 and an input from memory unit 124. Summing amplifier 132 receives an input from memory unit 124 and an input from LPF 120. The gain of the summing amplifiers is ½ at each input. The outputs of each of the summing amplifiers correspond to the sum of each of the two signals, and is then connected to the differential amplifiers where this summation is subtracted from the corresponding third signal from LPF 120, memory unit 122 or memory unit 124.

The differential amplifier 134 receives the signal from LPF 120 at the noninverting terminal, and the output of summing amplifier 130 at the inverting terminal. The differential amplifier 136 receives the signals from memory unit 122 at the noninverting terminal, and the output from summing amplifier 132 at the inverting terminal. The differential amplifier 138 receives the output from memory unit 124 at the noninverting terminal, and the output from summing amplifier 128 at the inverting terminal. The gain of the differential amplifiers are plus ⅔ at the noninverting terminal, and minus ⅔ at the inverting terminal, resulting in sequential chroma signals at the outputs of each amplifier.

The sequential outputs of each differential amplifier are sorted by the switches 140 and 142, which are synchronized by timer 118 to select the desired chroma signals resulting in continuous chroma signals, such as (R-Y) and (B-Y), from the switches. The continuous low resolution chroma signals are directed to a TV encoder 144.

The high resolution signals from the CCD are directed through a delay line 146 to a summing amplifier 148. The output from differential amplifier 134 is also connected to the amplifier 148 resulting in an output of full resolution luminance information signals. The full resolution luminance signals are directed to the encoder 144, synchronized by timer 118, where the signals are encoded into the desired format.

Figure 4:
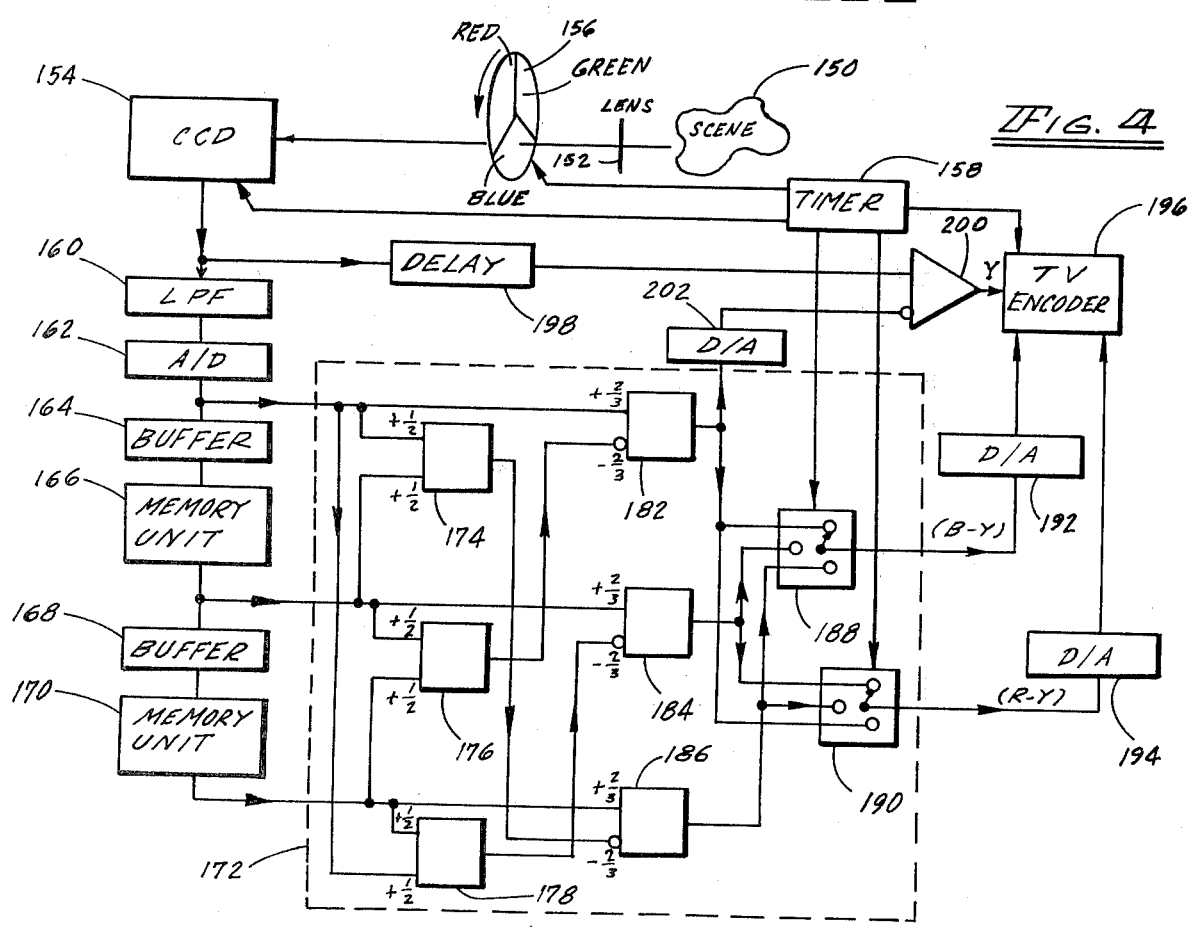
FIG. 4 is an electrical systematic diagram of a video camera utilizing a sequential three-color system and digital circuitry according to the present invention.

Referring now to FIG. 4, there is shown a camera system similar to that described in reference to FIGS. 1 and 3, wherein this system utilizes a three-color system with digital circuitry. A scene 150 to be televised is focused by lens system 152 onto an image sensing device such as CCD 154. A sequential coloring means 156 is shown as a rotating three-color wheel filter, to sequentially separate the images into three primary spectral regions for sensing by the CCD. The rate of color selection is controlled by a timer 158 which also synchronizes the scanning of the CCD. The output of the CCD is a line by line serial flow signal, containing the full resolution information signals. The output of the CCD is connected to a low pass filter (LPF) 160 which separates the low resolution information signals from the high resolution information signals. The low resolution signals from the LPF flow into an A/D converter 162 where the signals are converted to binary coded digital signals to facilitate processing. The output of the A/D corresponds to zero reference time and continues through a first buffer 164 to a first memory unit 166. The low resolution luminance and chroma signals of the first memory unit 166 correspond in time to a field scan which is one scan later than that of the output of the A/D 162. The output of first memory unit 166 is transferred through a second buffer 168 to a second memory unit 170. The low resolution signals from the second memory unit correspond in time to a field scan which is one scan later than the output of first memory unit 166, and two scans later than the output of the A/D 162. The low resolution information signals from the A/D 162, from the first memory unit 166, and from the second memory unit 170 are directed to a signal processing unit 172.

The signal processing unit includes three digital adder units 174, 176 and 178; and three digital subtractor units 182, 184 and 186; and a switching network of switches 188 and 190. Adder unit 174 receives signals from the A/D 162 and from the memory unit 166. Adder unit 176 receives signals from the memory unit 166 and from the memory unit 170. Adder unit 178 receives signals from the memory unit 170 and from the A/D 162. As discussed in reference to FIG. 3, the gain of the adder units is $\frac{1}{2}$ at each terminal. The output from each of the adder units corresponds to the sum of the two input signals, and is connected to one of the digital subtractor units where this summation is subtracted from the corresponding third signal.

The subtractor unit 182 receives the signals from A/D 162 at the noninverting terminal, and the output from adder unit 176 at the inverting terminal. Subtractor unit 184 receives the signals from memory unit 166 at the noninverting terminal, and the output from adder unit 178 at the inverting terminal. Similarly, subtractor unit 186 receives the signals from memory unit 170 at the noninverting terminal, and the output from adder unit 174 at the inverting terminal. As previously discussed in reference to FIG. 3, the gain of the subtractor units is plus $\frac{2}{3}$ at the noninverting terminal and minus $\frac{2}{3}$ at the inverting terminal, resulting in sequential chroma signals at the output of each of the subtractor units. The sequential chroma signal outputs from the subtractor units are selected by switches 188 and 190, resulting in continuous primary chroma signals, such as (R-Y) and (B-Y), as outputs from the signal processing unit 172. Each continuous chroma signal is directed to analog converters (D/A) 192 and 194 which convert the binary digital signals to analog signals. The D/A's further direct the signals to a TV broadcast encoder 196.

The high resolution required for luminance information signals is obtained from the output of CCD 154, which is passed through a delay line 198 and to the noninverting terminal of a differential amplifier 200. The signal from subtractor unit 182 is passed through a D/A converter 202, and is connected to the inverting terminal of amplifier 200. The output of amplifier 200 is full resolution luminance information signals. The full resolution signals are directed into the TV encoder 196, which is synchronized by timer 158, along with the chroma information signals to encode the signals into the desired format.

The embodiments of the above described invention have shown that the amount of memory storage usually required to process the color signal information has been substantially reduced. The system requires only a few small components for high quality color transmission, thereby providing a videocolor system which is relatively compact, lightweight, inexpensive and reliable. The system can be used as a miniature video color camera for standard broadcast or recording. The system can also be adapted for use with a endoscope or a microscope or other lens system to display an image on standard video monitors.

While specific embodiments of the present invention have been illustrated and described herein, it is realized that modifications and changes will occur to those skilled in the art. It is therefore to be understood that the appended claims are intended to cover all such modifications and changes as fall within the true spirit and scope of the invention.

I claim:

1. A video sequential color processing system comprising:

an image sensing device for sequentially receiving visual information and providing electrical read-out signals corresponding to the full resolution luminance and chroma information of each scan;

means for sequentially coloring the visual information received by said image sensing device, with a specific color during each scan of said image sensing device, so that the read-out signals are in sequential color flow relationship;

said sequential coloring means arranged in sets of complementary colors, so that a specific color is followed two scans later by the complement of the specific color;

means for separating low resolution luminance and chroma signals from the full resolution read-out signals;

a first memory unit for storing the low resolution signals from said separating means, and having an output corresponding in time to a field scan which is one field scan later than the output of said separating means;

a second memory unit for storing the low resolution signals received from said first memory unit, and having an output corresponding in time to a field scan which is one field scan later than the output of said first memory unit, and two field scans later than the output of said separating means;

a summing amplifier for receiving signals from said separating means, and from said second memory unit, resulting in an output of low resolution luminance;

a first pair of differential amplifiers, each receiving signals from said first memory unit, and signals from said summing amplifier, at opposite terminals, resulting in outputs of sequential chroma signals from each of said first pair of amplifiers;

a second pair of differential amplifiers, each receiving signals from said second memory unit, and signals from said separating means, at opposite terminals, resulting in outputs of sequential chroma signals from each of said second pair of amplifiers;

a timer means for synchronizing said sequential coloring means and said image sensing device;

a switching means which is controlled by said timer means and which selects the positive chroma signals from each of said first pair and each of said second pair of amplifiers into outputs of continuous low resolution primary chroma signals;

means for processing the full resolution read-out signals by canceling the chroma information signals, resulting in an output of full resolution luminance signal; and a television encoder which receives the full resolution luminance signal and the low resolution chroma signals, and encodes the signals into standard broadcast color format.

2. The video system as in claim 1, wherein said sequential coloring means is arranged in sets of complementary colors comprising blue-yellow and red-cyan.

3. The video system as in claim 1, wherein said image sensing device is a solid state scanning device known as a charge coupled device.

4. A video sequential color processing system comprising:

an image sensing device for sequentially receiving visual information and providing electrical read-out signals corresponding to the full resolution luminance and chroma information of each scan;

means for sequentially coloring the visual information received by said image sensing device, with a specific color during each scan of said image sensing device, so that the read-out signals are in sequential color flow relationship;

said sequential coloring means arranged in sets of complementary colors, so that a specific color is followed two scans later by the complement of the specific color;

means for separating low resolution luminance and chroma signals from the full resolution read-out signals;

an analog to digital converter means which receives the low resolution analog signals from said separating means and converts the signals to binary digital format;

a first memory unit for storing the low resolution signals from said separating means, and having an output corresponding in time to a field scan which is one field scan later than the output of said separating means;

a second memory unit for storing the low resolution signals received from said first memory unit, and having an output corresponding in time to a field scan which is one field scan later that the output of said first memory unit, and two field scans later than the output of said separating means;

a digital adder unit which receives signals from said A/D converter means, and from said second memory unit resulting in an output of low resolution luminance;

a first pair of digital subtractor units, each receiving signals from said first memory unit, and signals from said adder unit, at opposite terminals, resulting in outputs of sequential chroma signals from each of said first pair of subtractor units;

a second pair of digital subtractor units, each receiving signals from said second memory unit, and signals from said A/D converter means, at opposite terminals, resulting in outputs of sequential chroma signals from each of said second pair of subtractor units;

a timer means for synchronizing said sequential coloring means and said image sensing device;

a switching means which is controlled by said timer means and which selects the positive chroma signal from each of said first and each of said second pair of subtractor units, and which sorts the signals into outputs of continuous low resolution primary signals;

digital to analog converter means which receives the continuous low resolution primary output signals and converts the signals back to analog format;

means for processing the full resolution read-out signals by canceling the chroma information signal, resulting in an output of full resolution luminance signal; and a television encoder which receives the full resolution luminance signal and the low resolution chroma signals, and encodes the signals into standard broadcast format.

5. The system as in claim 4, which further comprises:

a first buffer unit between said A/D converter means and said first memory unit, to facilitate the receiving of signals from said A/D converter means while transferring signals from said first memory unit;

a second buffer unit between said first memory unit and said second memory unit, to facilitate the receiving of signals from said first memory unit while transferring signals from said second memory unit.

6. The system as in claim 4, wherein said sequential coloring means comprises the two sets of complementary colors of blue-yellow and red-cyan.

7. The system as in claim 4, wherein said image sensing device is a solid state scanning device known as a charge coupled device.

8. A video sequential color processing system comprising:

an image sensing device for sequentially receiving visual information and providing electrical read-out signals corresponding to the full resolution luminance and chroma information of each scan;

means for sequentially coloring the visual information received by said image sensing device with a primary color during each scan of said image sensing device, so that the read-out signals are in sequential color flow relationship;

a timer means for synchronizing said sequential coloring means and said image sensing device;

means for separating low resolution luminance and chroma signals from the full resolution read-out signals;

a first memory unit for storing the low resolution signals from said separating means, and having an output corresponding in time to a field scan which is one field scan later than the output of said separating means;

a second memory unit for storing the low resolution signals received from said first memory unit, and having an output corresponding in time to a field scan which is one field scan later that the output of said first memory unit, and two field scans later than the output of said separating means;

signal processing means which simultaneously receives the low resolution signals from said separating means, from said first memory unit and from said second memory unit, wherein the three signals are processed in combination where each one of the signals is added to one of the other signals, and the sum is subtracted from the non-added signal to yield sequential low resolution primary chroma signals, which are further sorted, resulting in outputs of continuous low resolution primary chroma signals;

means for processing the full resolution read-out signals by canceling the chroma information signals, resulting in an output of full resolution luminance signal; and a television encoder which receives the full resolution luminance signal, and the low resolution chroma signals from said signal processing means, and encodes the signals into standard broadcast color format.

9. The system as in claim 8, wherein said signal processing means comprises:
- a first summing amplifier which receives signals from said separating means and from said first memory unit;
- a second summing amplifier which receives signals from said first memory unit and from said second memory unit;
- a third summing amplifier which receives signals from said second memory unit and from said separating means;
- a first differential amplifier which receives the signals from said separating means at the non-inverting terminal, and the signal from said second summing amplifier at the inverting terminal;
- a second differential amplifier which receives the signals from said first memory unit at the non-inverting terminal, and the signals from said third summing amplifier at the inverting terminal;
- a third differential amplifier which receives the signals from said second memory unit at the non-inverting terminal, and the signals from said first summing amplifier at the inverting terminal; and
- a switching means which is controlled by said timer means and which selects the positive chroma signal from each of said first, second and third differential amplifiers, and having outputs of continuous, low resolution primary chroma signals.

10. The system as in claim 8, wherein said image sensing device is a solid state scanning device known as a charge coupled device.

11. The system as in claim 8, which further comprises:
- an analog to digital converter means which receives the low resolution analog signals from said separating means and converts the signals to binary digital format;
- a first digital adder unit which receives signals from said A/D converter means, and from said first memory unit;
- a second digital adder unit which receives signals from said first memory unit, and from said second memory unit;
- a third digital adder unit which receives signals from said second memory unit, and from said A/D converter means;
- a first digital subtractor unit which receives the signals from said A/D converter means at the non-inverting terminal, and the signals from said second adder unit at the inverting terminal;
- a second digital subtractor unit which receives the signals from said first memory unit at the non-inverting terminal, and the signals from said third adder unit at the inverting terminal;
- a third digital subtractor unit which receives the signals from said second memory unit at the non-inverting terminal, and the signals from said first adder unit at the inverting terminal;
- switching means which is controlled by said timer means and which selects the primary signals from each of said first, second, and third subtractor units, and having an output of continuous, low resolution, primary chroma signals; and
- digital to analog converter means which receives the continuous low resolution primary chroma output signals and converts the signals back to analog format.

12. The system as in claim 11, which further comprises:
- a first buffer unit between said A/D converter means and said first memory unit, to facilitate the receiving of signals from said A/D converter means while transferring signals from said first memory unit;
- a second buffer unit between said first memory unit and second memory unit, to facilitate the receiving of signals from said first memory unit while transferring signals from said second memory unit.

* * * * *